Patented Feb. 21, 1950

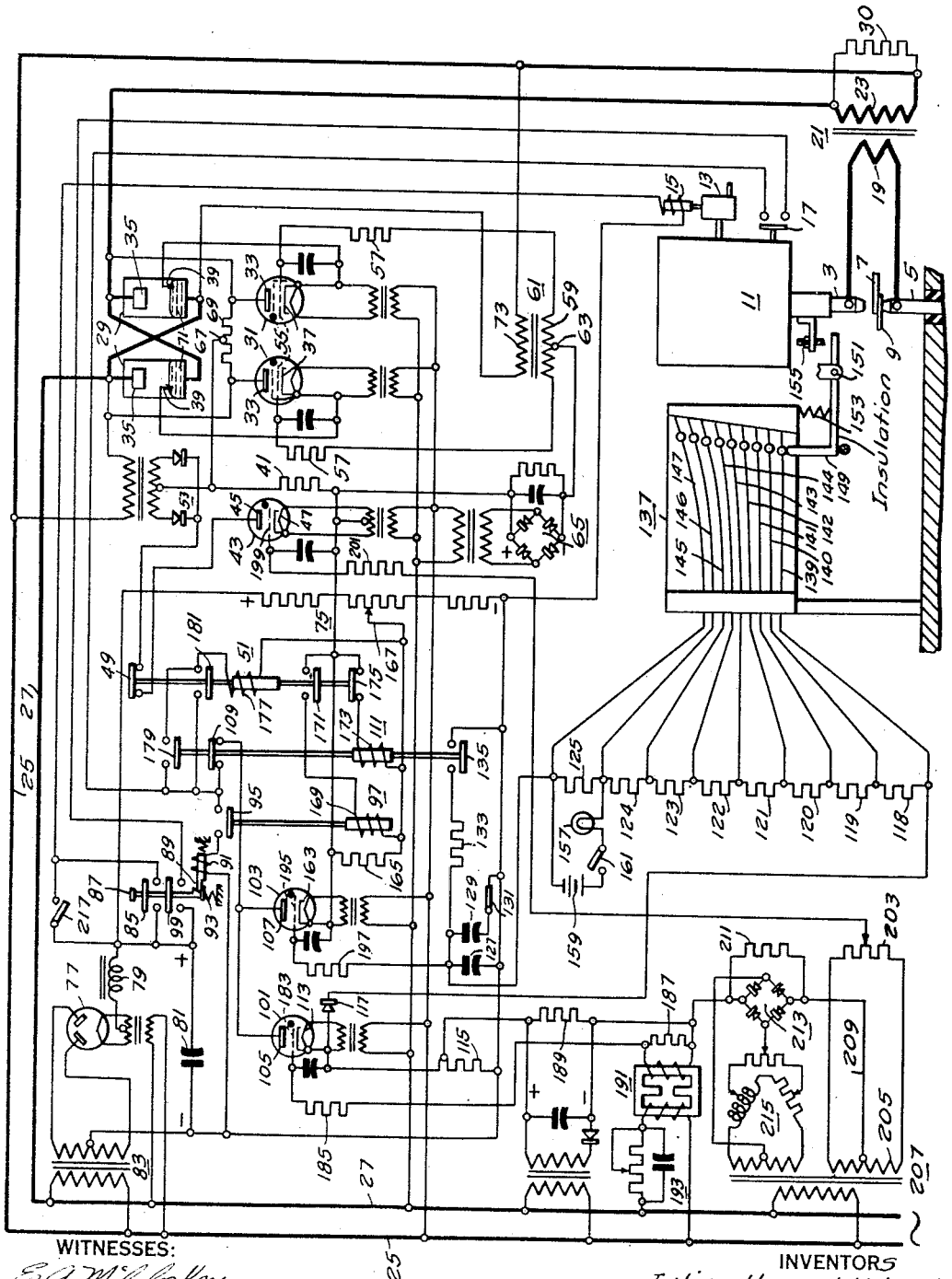

2,498,491

UNITED STATES PATENT OFFICE 2,498,491

WELDING CONTROL

Julius Heuschkel, Pittsburgh, Pa., and Philip M. La Hue, Denver, Colo., assignors to Westinghouse Electric Corporation, East Pittsburgh, Pa., a corporation of Pennsylvania Application October 24, 1946, Serial No. 705,366

22 Claims. (Cl. 219—4)

This invention relates to control apparatus and particularly to control apparatus for use with a resistance welding machine for spot welding.

In spot welding it is customary to employ a resistance welding machine having a pair of electrodes and pressure means for moving one of the electrodes relative to the other to clamp the work pieces to be welded therebetween. The electrodes are supplied with energy to produce a weld from a source of alternating voltage through electric valves and a welding transformer. The valves are controlled to determine the time during which current is supplied through the electrodes known as the weld-time as well as the magnitude of the effective current. After the welding current ceases, the electrodes continue to clamp the work pieces therebetween for a period commonly known as the hold-time. During this hold-time, the mass of the electrodes and the surrounding metal aid in dissipating the heat produced at the weld so that porosity and cracking at the weld is reduced while the weld nugget solidifies.

In the spot welding of work pieces it is customary to select the size of the electrode tips, the clamping force to be applied through the electrodes, the magnitude of the welding current to be supplied through the electrodes and the length of the time interval in which current is to be supplied, according to the particular work pieces to be welded. It is also common practice to change the tip size, clamping force, current magnitude and welding time with each significant change in the thickness of the material to be welded. By thickness of the material is meant the total thickness of the work pieces to be welded together at the point of weld.

Readjustments and changes in the setup of the welding machine for welding material of different thicknesses, where such operations are relatively frequent, require close attention, good judgment and skill on the part of the operator. Moreover, the time required for making these changes greatly increases the production cost.

It is accordingly an object of our invention to provide novel apparatus for use with a resistance welding machine in spot welding material of different thicknesses through which the overall operation is greatly facilitated.

Another object of our invention is to provide novel apparatus for use with a resistance welding machine in the spot welding of material of different thicknesses in which readjustments and setup changes in the machine are greatly reduced or eliminated.

A further object of our invention is to provide new and improved apparatus for use with a resistance welding machine in spot welding material of different thicknesses through which satisfactory welds may be produced with lower production costs and less skill and attention required of the operator.

While the strength of a weld varies with both the weld size and thickness, as does the heat required to form a satisfactory weld, our invention arises, at least in part, from the discovery that in spot welding metals, such as low carbon steels, welds of good quality may be made with materials of different thicknesses by changing the weld-time only. Thus, with the tip size, clamping force, magnitude of current and the hold-time maintained substantially constant, the required heat and weld strength for welds of different thicknesses can be developed by changing only the weld-time.

In accordance with our invention, we provide apparatus for use with a resistance welding machine in controlling the supply of energy to produce a weld, by which the welding time is adjusted automatically as a definite function of the thickness of the material to be welded. Moreover, it has been discovered experimentally that the most preferable time-thickness relationship for the closest spacing of welds necessary for strength purposes in low carbon steels may be defined as $$N = 1.67J + 6J^2 + 12J^3 \qquad (1)$$

where $J$ is the thickness in inches and $N$ is the time in seconds. Our invention contemplates automatically varying the welding time according to Equation 1.

It is not to be inferred that the foregoing equation represents the only time-thickness relationship that can be used for satisfactory results. The equation instead gives the approximate minimum time of welding current required for a satisfactory weld with any given thickness for minimum spacings. Our invention pertains to the automatic adjustment of the weld-time, according to a definite time-thickness relationship, as the only significant welding variable where the thickness of the material changes. Weld-time of the order given by the above equation is believed to be highly preferable for minimum weld spacing. For very widely spaced and single welds the approximate minimum time for a good weld has been found experimentally to be about seventy per cent of the value given in Equation 1.

It has been discovered that the time-thickness relationship given by Equation 1 also serves as a convenient measure of the minimum required hold-time for the solidification of the weld nugget. In accordance with another aspect of our invention, the hold-time may also be changed automatically with changes in the thickness of the material to increase the production speed.

In practice we prefer to select the tip size, clamping force and current as required for the maximum thickness of material within the range of operations. Then, with these values constant, the weld-time and hold-time are adjusted automatically with the thickness of the material. We have found a practical range of thicknesses which may be welded in this way is of the order of 6 to 1.

By means of our arrangement, the manual adjustments and setup changes of the machine customarily made in the past for each change in thickness of the material to be welded are eliminated. Good welds are then assured and are entirely independent of the attentions or inattentions and judgment of the operator. The apparatus is fully self-adjusting from weld to weld, regardless of whether subsequent welds are of the same or different thickness or on the same or different joints. Welds of the required minimum sizes may be produced at any conceivable sequence within a joint with stepless changes in weld sizes and strength as the thickness changes. Of possibly the most importance is that the elimination of the need for making any changes in the machine setup over a wide range of thicknesses provides a definite production economy where the thickness changes with some frequency.

The features of our invention, which we believe to be novel, are set forth with more particularity in the accompanying claims. The invention itself, however, together with additional objects and advantages thereof, may be better understood from the following description of a specific embodiment when read in connection with the accompanying drawing, in which the single figure is a schematic circuit diagram of an embodiment of our invention as applied to a resistance welding machine.

As shown in the drawing, the welding machine includes a pair of welding electrodes 3 and 5, one of which, 5, is stationary while the other, 3, is movable, to clamp the work pieces 7 and 9 to be welded therebetween. The electrode 3 is adapted to be moved by a suitable pressure means 11, which may utilize any suitable medium, such as air. The application of the pressure is controlled by a solenoid-operated valve 13, which, when energized, causes the electrode 3 to be moved into clamping position, where it is held until deenergization of the solenoid coil 15. A back-pressure switch is provided having a contact 17 which is closed only after the pressure means 11 has moved the electrode 3 into clamping position with the desired force.

The secondary winding 19 of a welding transformer 21 is connected from one of the electrodes 3 and 5 to the other. The primary winding 23 of the welding transformer 21 is connected to be energized from alternating-voltage supply lines 25 and 27 through a pair of inversely connected valves 29, preferably of the arc-like type, such as ignitrons. A resistor 30 is connected across the primary winding 23 to absorb current surges and prevent backfiring of the ignitrons 29.

An electric valve 31, also preferably of the arc-like type, such as a thyratron, is provided for each of the ignitrons 29 and is designated hereinafter as a firing tube. Each firing tube 31 has an anode 33 connected to the anode 35 of the corresponding ignitron 29, and a cathode 37 connected to the igniter 39 of the corresponding ignitron 29. Thus, whenever a firing tube 31 becomes conductive, the anode 35 of the corresponding ignitron is positive and the current through the firing tube 31 and igniter 39 renders the ignitron conductive to effect a flow of current through the electrodes 3 and 5.

The firing tubes 31 are controlled by a single voltage produced across a resistor 41 in the output circuit of another valve 43. This valve 43 is also preferably of the arc-like type, such as a thyratron, and is designated hereinafter as the control tube. The anode 45 and cathode 47 of the control tube 43 are connected in series with the resistor 41 through a normally closed contact 49 of a first relay 51 across a full-wave rectifier 53 energized from the supply lines 25 and 27.

The control circuit for each firing tube 31 extends from the control electrode 55 thereof through a corresponding grid resistor 57 to one end of the secondary winding 59 of an auxiliary transformer 61, the control electrodes 55 of the two firing tubes 31 being connected to opposite ends of the secondary winding 59. The control circuit continues from a center tap 63 on the secondary winding 59 through a source of biasing voltage 65 and the resistor 41 in circuit with the control tube 43 to an intermediate tap 67 on a resistor 69 connected between the anodes 33 of the two firing tubes 31. From the anode of one firing tube the control circuit of the other firing tube continues through the cathode 71 and igniter 39 of the corresponding ignitron 29 to the cathode 37 of the firing tube. The biasing voltage of source 65 normally maintains the firing tubes 31 non-conductive. Each firing tube 31 is rendered conductive at the instant in a half-period of the alternating voltage in which the anode thereof is positive, when the control tube 43 becomes conductive. The resistor 69, between the anodes 33 of the firing tubes 31, is provided to enable a single voltage across the resistor 41 to control both firing tubes. However, because of the connections of resistor 69 to the supply lines 25 and 27, an alternating-current ripple is produced thereacross. This ripple is balanced out by the voltage supplied through the auxiliary transformer 61, the primary winding 73 of which is energized from the supply lines 25 and 27.

The control tube 43 is rendered conductive at a preselected instant in each half-period of the alternating supply voltage throughout the weld-time interval. The instant in a half-period at which the control tube 43 becomes conductive is determined by a heat control voltage, while the length of the weld-time interval is determined by a timing circuit.

The timing circuit includes a voltage divider 75, across which a direct-current voltage is maintained by means of a full-wave rectifier 77 and filtering elements 79 and 81 energized from the supply lines 25 and 27 through another auxiliary transformer 83. The coil 15 of the solenoid valve 13 for the pressure means 11 is connected across the divider 75 through a first contact 85 on a push-button switch 87. The push-button switch 87 is normally open, but, when closed manually, it is retained in closed position by a solenoid operated detent 89 until the detent solenoid coil 91 is energized, at which time the push-button switch 87 is opened by means of a spring 93. The detent solenoid coil 91 is connected across the voltage divider 75 through a normally open contact 95 of a second relay 97, the back-pressure contact 17 and a second contact 99 on the push-button switch 87.

A pair of electric valves 101 and 103, preferably of the arc-like type, such as thyratrons, are employed in the timing circuit. The first of these valves 101 is hereinafter designated as the start tube, and the second valve 103 is hereinafter designated as the stop tube. The anodes 105 and 107 of the start and stop tubes 101 and 103 are connected together and to the positive terminal of the voltage divider 75 through a normally closed contact 109 of a third relay 111, the back-pressure contact 17 and the second contact 99 of the push-button switch 87. The cathode 113 of the start tube 101 is connected through a resistor 115 to the negative terminal of the divider 75. In parallel with this resistor 115, and connected in series with each other, are a rectifier 117, a plurality of resistor elements 118—125 and a first timing capacitor 127. A second timing capacitor 129 is normally connected in parallel with the first timing capacitor 127 through a hand switch 131 which may be opened for purposes explained hereinafter. A discharge circuit, including a resistor 133 and a normally open contact 135 of the third relay 111, is provided across the timing capacitors 127 and 129.

Each of the plurality of resistor elements 118—125 is connected between two adjacent contacts of a multiple contact device 137, such as the one manufactured by the Westinghouse Electric Corporation under the trade name "Silverstat." For brevity purposes, we shall, in the claims, refer to a device of this specific structure or its equivalent in the art as a "thickness responsive parameter" on a stationary portion of the welding machine and includes a plurality of flexible leaves 139—147 mounted one above the other. The leaves are secured and insulated from each other at one end but are free and carry contacts on the other end. A lever 149 of insulating material is arranged to be moved in a direction to engage the free end of the first leaf 139 and move it toward the second leaf 140 to make contact therewith. Upon continued movement of lever 149 in the same direction, leaf 140, which is still in contact with leaf 139, also makes contact with the third leaf 141. Further movement of the lever 149 causes successive contact between successive leaves of the contact device. It is apparent that when the first and second leaves 139 and 140 are in contact, the first resistor element 118 connected therebetween is short-circuited, and so on, until the total resistance afforded by all of the resistor elements 118—125 in the circuit is determined by the position of the movable lever 149.

The lever 149 is pivoted at the point 151 and is biased by a spring 153 so that normally none of the leaves 139—147 are in contact. The end of the lever remote from the leaves is positioned to engage an adjustable threaded member 155 mounted on and movable with the movable electrode 3 of the welding machine. Consequently, as the electrode 3 moves in position to clamp the pieces to be welded therebetween, the lever 149 is moved to cause a certain number of the leaves 139—147 to be in contact corresponding to the position of the movable electrode 3, which, in turn, is determined by the thickness of the material to be welded.

The adjustable member 155 on the movable electrode 3 and a lamp 157 connected in shunt across the last resistor element 125 of the series through a source of voltage, illustrated as a battery 159, and a hand switch 161, are provided to permit an initial adjustment of the apparatus. This adjustment is described hereinafter in connection with the operation of the system.

The cathode 163 of the stop tube 103 is connected to the cathode 47 of the control tube 43 and is also connected through a resistor 165 to an intermediate tap 167 on the voltage divider 75. The coil 169 of the second relay 97 is connected across the resistor 165 through a normally open contact 171 of the first relay 51. The coil 173 of the third relay 111 is also connected across the resistor 165 through a normally closed contact 175 of the first relay 51. The coil 177 of the first relay 51 is connected from the positive terminal of the divider 75 to the intermediate tap 167 thereof, through the second contact 99 of the push-button switch 87, the back-pressure contact 17 and a normally open contact 179 of the third relay 111. A sealing-in contact 181 of the first relay 51 is connected in shunt across the open contact 179 of the third relay 111.

The control circuit of the start tube 101 may be traced from the control electrode 183 thereof, through a grid resistor 185, a pair of resistors 187 and 189, to the cathode 113. A direct-current biasing voltage is impressed across one of the resistors 189 which tends to maintain the start tube 101 non-conductive. A voltage impulse sufficient to overcome the biasing voltage and render the start tube 101 conductive is periodically impressed across the other resistor 187. The voltage impulse is obtained through a peaking transformer 191 energized from the supply lines 25 and 27 through a phase-shifting circuit 193. The phase-shifting circuit 193 is adjusted so the voltage impulse across the resistor 187 renders the start tube 101 conductive at an instant in the period of the alternating-supply voltage, dependent upon the power factor of the load and corresponding to the current zero point.

The control circuit of the stop tube 103 may be traced from the control electrode 195 thereof through a grid resistor 197 and the timing capacitors 127 and 129 to the negative terminal of the divider 75. From the intermediate tap 167 on the divider, the control circuit continues through the resistor 165 to the cathode 163 of the stop tube. The voltage across the divider 75 between the intermediate tap 167 and the negative terminal tends to maintain the stop tube 103 non-conductive. However, when the start tube 101 is rendered conductive, current flows through the timing capacitors 127 and 129 to charge them at a rate determined by the resistance provided in the circuit by the resistor elements 118—125. When the charge on the timing capacitors 127 and 129 attains a preselected magnitude, the stop tube 103 is rendered conductive.

The control circuit of the control tube 43 may be traced from the control electrode 199 thereof, through a grid resistor 201, a balancing bridge including a resistor 203 and a secondary winding 205 of an auxiliary transformer 207, a conductor 209, a resistor 211, the resistor 189, the resistor 115 to the negative terminal of the divider 75 and then from the intermediate tap 167 through the resistor 165 to the cathode 47 of the control tube 43.

The portion of the divider 75 in the control circuit of the control tube 43 and the biasing voltage on resistor 189 provide a voltage tending to maintain the control tube 43 non-conductive.

A heat-control voltage is provided across the resistor 211 through a full-wave rectifier 213 and an adjustable phase-shifting circuit 215 energized from the supply lines 25 and 27 through the auxiliary transformer 207. The voltage across the resistor 211 has a wave form with respect to the control electrode 199 of the control tube 43 of an inverted, rectified, alternating-voltage displaced in phase with respect to the alternating-supply voltage. As is explained later, the instant in a half-period of the alternating voltage at which the control tube 43 is rendered conductive is determined by the amount of phase shift of the voltage across resistor 211.

The balancing bridge is of the usual type to provide an alternating voltage component when necessary to compensate for slightly different firing characteristics of the two firing tubes and associated ignitrons.

Prior to initiation of welding operations, the setting of the contact device 137 must be adjusted. A hand switch 217 about the push-button switch 87 is closed to effect energization of the solenoid valve 13 so the movable welding electrode 3 is brought down under the proper pressure without any material between the tips. With the electrodes in this position, the adjustable member 155 is adjusted until all of the leaves 139—147 of the contact device 137 are just in contact. The hand switch 161 is closed so contact between the last two leaves 146 and 147 would, of course, be indicated by the lighting of the indicator lamp 157. With all the leaves in contact, the adjustable member 155 is locked in place, hand switches 161 and 217 are opened and the unit is ready for operation.

To initiate operation of the apparatus, the push-button switch 87 is closed. As previously explained, the push-button switch 87, once closed, is maintained in that position so long as the detent solenoid coil 91 remains deenergized. The first contact 85 of the push-button switch 87 completes a circuit through the coil 15 of the solenoid valve 13 of the pressure means 11. As a result, the movable electrode 3 is moved downwardly to clamp the work pieces 7 and 9 to be welded between the two electrodes 3 and 5. At the same time, the lever 149 is moved to cause a number of the leaves 139—147 of the contact device to contact each other, corresponding to the thickness of the work pieces to be welded.

After the movable electrode 3 is in position, the back-pressure contact 17 closes so that a circuit is completed from the positive terminal of the divider 75 through the second contact 99 of the push-buttton switch 87, the contact 17 of the back-pressure switch and the normally closed contact 109 of the third relay 111 to the anodes 105 and 107 of the start and stop tubes 101 and 103. Thereafter, the next voltage impulse across the resistor 137 in the control circuit of the start tube 101 renders the start tube conductive to initiate charging of the timing capacitors 127 and 129.

When the start tube 101 becomes conductive, the point on the control circuit of the control tube 43 nearest to the cathode 113 of the start tube is raised almost to the potential of the positive terminal of the divider 75. Consequently, the direct-current voltage component of the resultant voltage between the control electrode and cathode of the control tube becomes less negative so the peaks of the resultant voltage, as provided through the heat control voltage on resistors 211, render the control tube 43 conductive.

The phase position of the peaks and therefore the instant in a half-period at which the control tube becomes conductive is adjusted by the phase-shifting circuit 215. The firing tubes 31 are rendered conductive in alternate half-periods by the action of the control tube 43 and, in turn, cause the ignitrons 29 to be rendered conductive alternately in opposite half-periods of the supply voltage. Consequently, current is supplied through the welding transformer to produce a weld in the work pieces clamped between the electrodes, the weld-time interval being initiated when the start tube becomes conductive.

Charging of the timing capacitors 127 and 129 is also initiated when the start tube 101 becomes conductive. The rate of charge of the timing capacitors depends upon the amount of resistance afforded by the resistor elements 118—125 in series therewith. This, in turn, depends upon the number of leaves of the contact device 137, which are in contact with each other, to correspond to the thickness of the material to be welded. For reasons previously discussed, we prefer to select the resistances of the various resistor elements 118—125 so that the time required to charge the timing capacitors 127 and 129 to the voltage necessary to render the stop tube 103 conductive is determined by the Equation 1 previously set forth. When the stop tube 103 becomes conductive, the cathode 47 of the control tube 43, being connected to the cathode 163 of the stop tube 103, is raised almost to the voltage of the positive terminal of the divider 75, so that the control tube 43 is no longer rendered conductive in each half-period. Thus, the weld-time interval is ended and the supply of welding current ceases. At the same time current flows through the stop tube 103, the normally closed contact 175 of the first relay 51 and the coil 173 of the third relay 111 to energize the latter.

Upon energization of the third relay 111, the first contact 179 thereof is closed to complete the circuit through the coil 177 of the first relay 51. The second contact 109 of the third relay 111 is opened to break the anode circuits of both the start and stop tubes 101 and 103, and the third contact 135 is closed to complete the discharge circuit across the timing capacitors 127 and 129.

When the first relay 51 is energized by the action of the third relay 111, the first contact 49 thereof is opened so that as long as the first relay 51 remains in its energized position the control tube 43 cannot become conductive. The second contact 181 of the first relay 51 completes a sealing-in circuit for the coil 177. This is necessary since the third relay 111 returns to its deenergized position when the second contact 109 thereof breaks the anode circuits of the start and stop tubes 101 and 103. The third contact 171 of the first relay 51 completes the connection of the coil 169 of the second relay 97 across the resistor 165 in the cathode circuit of the stop tube 103. However, the stop tube 103 is now deenergized so that the second relay 97 remains in its deenergized position. The fourth contact 175 of the first relay 51 opens the energizing circuit of the third relay 111.

Thus far it is apparent that the weld-time depends upon and is automatically adjusted in accordance with the thickness of the material to be welded. Moreover, by the proper selection of the resistor elements 118—125, the weld-time is made a definite function of the thickness in accordance with the equation previously set forth.

It is apparent that the number of resistor elements and the resistances thereof may be selected as desired. The arrangement of contactors may, of course, be used to vary another parameter of the welding current, if desired. Moreover in accordance with certain aspects of our invention, other arrangements may be provided to translate the mechanical spacing of the electrodes into an adjustment of the timing circuit.

When the fourth contact 175 of the first relay 51 opens the energizing circuit for the third relay 111, that third relay returns to its deenergized position but only after a slight time delay provided by a delay slug on the relay. Thus, the discharge circuit for the timing capacitors 127 and 129 is opened, the capacitors by this time having been fully discharged, and the anode circuits of the start and stop tubes 101 and 103 are again completed. The timing operation is then repeated, but it is noted that since the first relay 51 is still energized, no welding current flows.

At the end of the second timing period the stop tube 103 again becomes conductive. This time, the second relay 97 is energized instead of the third relay 111 and completes the circuit through the coil 91 of the detent solenoid 89. The solenoid is moved out of engagement with the push-button switch 87 so that the latter is immediately opened by the biasing spring 93. Upon opening of the push-button switch 87, the solenoid valve 13 of the pressure means 11 is deenergized and the movable electrode 3 is moved upwards out of engagement with the material which has just been welded.

It is then apparent that the second time period constitutes the hold-time. During this period, the electrodes 3 and 5 are maintained in contact with the pieces which had just been welded but no welding current is supplied.

It is to be understood that while we have shown a system in which both the weld-time and the hold-time are automatically adjusted in accordance with the thickness of the material to be welded, it may be desirable in some cases to have only the weld-time so adjusted. It is also to be noted that various relays associated with the stop tube may be employed for other operations in addition to those described, such as the initiation of a foregoing pressure during the hold-time period.

It is also to be understood that we prefer the capacitors 127 and 129 to be of a size relative to the resistor elements 118—125 to provide timing as set forth in Equation 1. The capacitors are also preferably of a size relative to each other so that when switch 131 is opened, the timing is about seventy per cent of that set forth in Equation 1 for use in making single or very widely spaced welds in which the shunting effect of the previous weld is not appreciable.

While we have shown and described a preferred embodiment of our invention, we are aware that many modifications thereof may be made without departing from the spirit of the invention. It is not our intention to limit the scope of our invention to the special apparatus described.

We claim as our invention:

1. Apparatus for use with a resistance welding machine adapted to have energy supplied thereto from an electric power source to produce a weld and having means providing an indication of the thickness of the material to be welded, comprising valve means interposed between said source and machine for controlling the supply of energy, and a control network for said valve means adapted to be coupled to and responsive to said indicating means for limiting the supply of energy to a time interval of a length dependent upon the thickness of the material to be welded.

2. Apparatus for use with a resistance welding machine adapted to have energy supplied thereto from an electric power source to produce a weld and having means providing an indication of the thickness of the material to be welded, comprising valve means interposed between said source and machine for controlling the supply of energy, and a control network for said valve means adapted to be coupled to and responsive to said indicating means for limiting the supply of energy to a time interval of a length in seconds of the order of $1.67J + 6J^2 + 12J^3$, where J is the thickness of the material in inches.

3. Apparatus for use with a resistance welding machine adapted to have energy supplied thereto from an electric power source to produce a weld widely spaced from previous welds and having means providing an indication of the thickness of the material to be welded, comprising valve means interposed between said source and machine for controlling the supply of energy, and a control network for said valve means adapted to be coupled to and responsive to said indicating means for limiting the supply of energy to a time interval of a length in seconds of the order of $.7(1.67J + 6J^2 + 12J^3)$, where J is the thickness of the material in inches.

4. Apparatus for use with a resistance welding machine adapted to have energy supplied thereto from an electric power source to produce a weld and having means providing an indication of the thickness of the material to be welded, comprising valve means interposed between said source and machine for controlling the supply of energy, and a control network for said valve means adapted to be coupled to and responsive to said indicating means for limiting the supply of energy to a time interval of a length dependent upon the thickness of the material to be welded, said control means including a selector for selecting a time interval length in seconds of the order of either $(1.67J + 6J^2 + 12J^3)$ or $.7(1.67J + 6J^2 + 12J^3)$ where J is the thickness in inches.

5. Apparatus for use with a resistance welding machine having a pair of electrodes, one of which is movable relative to the other to engage the material to be welded therebetween when a weld is to be made, with the electrodes being adapted to have energy supplied thereto from an electric power source, comprising valve means interposed between said source and electrodes for controlling the supply of energy, and a control network for said valve means adapted to be coupled to said electrodes and responsive to the relative positions thereof for limiting the supply of energy to a time interval of a length which is a definite function of the thickness of the material to be welded.

6. Apparatus for use with a resistance welding machine having a pair of electrodes, one of which is movable relative to the other to engage the material to be welded therebetween when a weld is to be made, with the electrodes being adapted to have energy supplied thereto from an electric power source, comprising valve means interposed between said source and electrodes for controlling the supply of energy, and a control network for said valve means adapted to be coupled to said electrodes and responsive to the relative positions thereof for limiting the supply of energy to a time interval of a length in seconds at least as long as $1.67J+6J^2+12J^3$ where $J$ is the thickness of the material in inches.

7. Apparatus for use with a resistance welding machine adapted to have energy supplied thereto from an electric power source to produce a weld and having a pair of members, one of which is movable relative to the other, adapted to engage the pieces to be welded therebetween, comprising valve means interposed between said source and machine for controlling the supply of energy, and a control network for said valve means including timing means for limiting the supply of energy to a predetermined time interval, said timing means having an adjustable mechanism to be actuated from said members and responsive to the relative positions thereof to adjust the length of said interval according to the thickness of the material to be welded.

8. Apparatus for use with a resistance welding machine having a pair of electrodes and pressure means effective to move one of the electrodes relative to the other to engage the material to be welded therebetween when a weld is to be made, with the electrodes adapted to have energy to produce a weld supplied thereto from an electric power source, comprising valve means interposed between said source and electrodes for controlling the supply of energy, a control network for said valve means, release means effective to operate said pressure means to cause the electrodes to release the material, and timing means for causing said control network to limit the supply of energy to a first predetermined time interval and for rendering said release means effective upon expiration of a second predetermined time interval immediately succeeding said first interval, said timing means including an adjustable mechanism to be actuated from said electrodes and responsive to the relative positions thereof when a weld is to be made to adjust the lengths of said first and second intervals according to the thickness of the material to be welded.

9. Apparatus for use with a resistance welding machine having a pair of electrodes and pressure means for moving one of the electrodes relative to the other to engage the material to be welded therebetween when a weld is to be made, with the electrodes adapted to have energy to produce a weld supplied thereto from an electric power source, comprising valve means interposed between said source and electrodes for controlling the supply of energy, a control network for said valve means, release means effective to operate said pressure means to cause the electrodes to release the material, and timing means for causing said control means to limit the supply of energy to a first predetermined time interval and for rendering said release means effective upon expiration of a second predetermined time interval immediately succeeding said first interval, said timing means including an adjustable mechanism to be actuated from said electrodes and responsive to the relative positions thereof when a weld is to be made to adjust the lengths of said first and second intervals in seconds to about $1.67J+6J^2+12J^3$ where $J$ is the thickness in inches of the material to be welded.

10. Apparatus for use with a resistance welding machine for producing a weld widely spaced from previous welds and having a pair of electrodes and pressure means for moving one of the electrodes relative to the other to engage the material to be welded therebetween when a weld is to be made, with the electrodes adapted to have energy to produce a weld supplied thereto from an electric power source, comprising valve means interposed between said source and electrodes for controlling the supply of energy, control means for said valve means, release means effective to operate said pressure means to cause the electrodes to release the material, and timing means for causing said control means to limit the supply of energy to a first predetermined time interval and for rendering said release means effective upon expiration of a second predetermined time interval immediately succeeding said first interval, said timing means including an adjustable mechanism to be actuated from said electrodes and responsive to the relative positions thereof when a weld is to be made to adjust the lengths of said first and second intervals in seconds to about $.7(1.67J+6J^2+12J^3)$ where $J$ is the thickness in inches of the material to be welded.

11. Apparatus for use with a resistance welding machine having a pair of electrodes and pressure means for moving one of the electrodes relative to the other to engage the material to be welded therebetween when a weld is to be made, with the electrodes adapted to have energy to produce a weld supplied thereto from an electric power source, comprising valve means interposed between said source and electrodes for controlling the supply of energy, a control network for said valve means, release means effective to operate said pressure means to cause the electrodes to release the material, and timing means for causing said control network to limit the supply of energy to a first predetermined time interval and for rendering said release means effective upon expiration of a second predetermined time interval immediately succeeding said first interval, and a selector for setting said timing means to select said first and second time interval lengths in seconds of the order of either $(1.67J+6J^2+12J^3)$ or $.7(1.67J+6J^2+12J^3)$ where $J$ is the thickness in inches of the material to be welded.

12. Apparatus for resistance welding a material comprising a pair of electrodes adapted to engage the material to be welded therebetween, means for supplying welding current of substantially constant amplitude through said electrodes and material, and a timing network coupled to said supply means and including a mechanism responsive to the spacing between said electrodes to limit the supply of welding current to a time interval dependent upon the thickness of the material to be welded.

13. Apparatus for resistance welding a material comprising a pair of electrodes adapted to engage the material to be welded therebetween, means for supplying welding current of substantially constant amplitude through said electrodes and material, and a network coupled to said supply means and including a mechanism responsive to the spacing between said electrodes to vary a parameter of said welding current in accordance with the thickness of the material to be welded.

14. Apparatus for spot welding a material comprising a pair of electrodes adapted to engage the material to be welded therebetween, means for supplying welding current comprising a predetermined number of pulses of substantially constant amplitude through said electrodes and material, and a network coupled to said supply means and including a mechanism responsive to the spacing between said electrodes to preset said number of pulses in dependence upon the thickness of the material to be welded.

15. The method of resistance welding material of different thicknesses with welding electrodes through which welding current is supplied and which engage the material to be welded therebetween during the supply of welding current and for a preselected time interval immediately thereafter, which comprises varying the length of time during which welding current flows and the length of said time interval immediately thereafter in accordance with the thickness of the material.

16. Apparatus for use with a resistance welding machine adapted to have energy supplied thereto from an electric power source to produce a weld and having a pair of members, one of which is movable relative to the other, adapted to engage the pieces to be welded therebetween, comprising valve means interposed between said source and machine for controlling the supply of energy, and a control network for said valve means including timing means for limiting the supply of energy to a predetermined time interval, said timing means having a mechanism to be mechanically actuated from said members and responsive to the relative positions thereof to adjust the length of said interval according to the thickness of the material to be welded.

17. The method of resistance welding a material of the low carbon steel type which comprises transmitting current of substantially constant amplitude through the material for a time interval of a length in seconds of the order of $1.67J + 6J^2 + 12J^3$ where J is the thickness of said material in inches.

18. The method of resistance welding a material of the low carbon steel type which comprises subjecting said material to pressure substantially independent of its thickness in the region in which it is to be welded and transmitting current of substantially constant amplitude through the material for a time interval of a length in seconds of the order of $1.67J + 6J^2 + 12J^3$ where J is the thickness of said material in inches.

19. Apparatus for use with a resistance welding machine adapted to have energy supplied thereto from an electric power source to produce a weld and having means providing an indication of the thickness of the material to be welded, comprising valve means interposed between said source and machine for controlling the supply of energy, and a control network for said valve means including a thickness responsive parameter adapted to be coupled to and responsive to said indicating means for limiting the supply of energy to a time interval of a length dependent upon the thickness of the material to be welded.

20. Apparatus for use with a resistance welding machine having a pair of electrodes, one of which is movable relative to the other to engage the material to be welded therebetween when a weld is to be made, with the electrodes being adapted to have energy supplied thereto from an electric power source, comprising valve means interposed between said source and electrodes for controlling the supply of energy, and a control network for said valve means adapted to be coupled to said electrodes and including a thickness responsive parameter responsive to the relative positions thereof for limiting the supply of energy to a time interval of a length which is a definite function of the thickness of the material to be welded.

21. Apparatus for resistance welding a material comprising a pair of electrodes adapted to engage the material to be welded therebetween, facilities for supplying welding current through said electrodes and material, and a timing network coupled to said facilities and including a thickness responsive parameter responsive to the spacing between said electrodes to limit the supply of welding current to a time interval dependent upon the thickness of the material to be welded.

22. For use in the welding of material of different thicknesses from a power source with apparatus including electrodes, means for applying force between said electrodes and said material, said force being independent of thickness and being determined empirically as that force which yields satisfactory welds over the range of thickness of the material to be welded and the dimensions of said electrodes being determined empirically as the electrode dimensions which yield satisfactory welds for the force and the range of thickness of the materials to be welded and means for transmitting current through said electrodes and said material independently of thickness, the peak magnitude of said current being determined empirically as that which yields satisfactory welds for the force and the range of thickness of said material; the combination comprising a timing network for determining the time interval during which said current is transmitted and a device responsive to the thickness of the material and adapted to cooperate with said network for varying said interval in accordance with the thickness of said material.

JULIUS HEUSCHKEL.
PHILIP M. LA HUE.

REFERENCES CITED

The following references are of record in the file of this patent:

UNITED STATES PATENTS

| Number | Name | Date |
| --- | --- | --- |
| 1,744,804 | Sanborn | Jan. 28, 1930 |
| 2,236,998 | Gillette | Apr. 1, 1941 |
| 2,323,349 | Odquist | July 16, 1943 |

OTHER REFERENCES

"Welding Handbook," 1942, A. W. S. pages 270–1.